(12) United States Patent
Carter

(10) Patent No.: US 11,559,133 B2
(45) Date of Patent: Jan. 24, 2023

(54) MULTI-FEATURE CLEANING APPARATUS FOR A SUPPORTING OR RESTRAINING MEMBER

(71) Applicant: April Armstrong Carter, Reisterstown, MD (US)

(72) Inventor: April Armstrong Carter, Reisterstown, MD (US)

( * ) Notice: Subject to any disclaimer, the term of this patent is extended or adjusted under 35 U.S.C. 154(b) by 181 days.

(21) Appl. No.: 16/857,925

(22) Filed: Apr. 24, 2020

(65) Prior Publication Data
US 2021/0330065 A1 Oct. 28, 2021

(51) Int. Cl.
*A46B 5/00* (2006.01)
*B60S 3/00* (2006.01)

(52) U.S. Cl.
CPC .... *A46B 5/0012* (2013.01); *A46B 2200/3013* (2013.01); *A46B 2200/3073* (2013.01); *B60S 3/008* (2013.01)

(58) Field of Classification Search
CPC ...... B60S 3/008; B60S 3/0045; A46B 5/0041; A46B 5/0012; A46B 5/0033; A46B 5/0054; A46B 5/0058; A46B 2200/3046
See application file for complete search history.

(56) References Cited

U.S. PATENT DOCUMENTS

| 1,951,079 | A | * | 3/1934 | Zihlman | G01F 23/045 |
| | | | | | D32/46 |
| 2017/0206865 | A1 | * | 7/2017 | Chiappetta | G10D 3/00 |
| 2018/0206622 | A1 | * | 7/2018 | Wilson | A46B 7/044 |

* cited by examiner

Primary Examiner — Shay Karls

(57) ABSTRACT

The present disclosure generally relates to a portable, daily-use cleaning product. More specifically, the present disclosure relates to an apparatus, device, or structural system that is adapted to clean or disinfect a restraining member, such as a seatbelt in a car or a restraining belt of an airplane seat or train, or a supporting member, such as a support bar in a subway car or metro bus, and other suitable examples.

4 Claims, 6 Drawing Sheets

MULTI-FEATURE CLEANING APPARATUS FOR A SUPPORTING OR RESTRAINING MEMBER

TECHNICAL FIELD

The present disclosure generally relates to a portable, daily-use cleaning product. More specifically, the present disclosure relates to an apparatus, device, or structural system that is adapted to clean or disinfect a restraining member, such as a seatbelt in a car or a restraining belt of an airplane seat or train, or a supporting member, such as a support bar in a subway car or metro bus, and other suitable examples.

BACKGROUND

Restraining members, such as a seatbelt in a car, and supporting members, such as support bars in a subway car, are used frequently every day. For example, every time a driver enters a rental vehicle, that driver must secure himself or herself with a seatbelt. The driver must touch the seatbelt to pull the seatbelt to the secured buckle. Frequent handling of seatbelts, however, can cause dirt, grease, dust, viruses, and bacteria to collect on the surface of the seatbelt; especially in a rental car, which is driven by many different drivers over time. Similarly, riders on a metro bus or a subway car often need to hold a supporting bar to stand stably while the bus or subway car is in motion. The frequent handling of the support bar can also leave dirt, grease, dust, viruses, and bacteria, for example, which can potentially cause harm to the riders; especially during flu season.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure solve the above-described problems by providing a portable, daily-use cleaning apparatus, device, or structural system that can easily be carried around by users. In some implementations, the cleaning apparatus, device, or structural system can be adapted to include an upper body and a lower body. The upper body may be an elongated member with at least one substantially flat surface. The elongated member may or may not be adapted with a cavity portion. A cleaning portion may be secured to the substantially flat surface of the upper body. For example, the cleaning portion may include bristles of a brush, towel fibers, a microfiber material that is soaked in a disinfecting substance (e.g., a bleach composition), or any other suitable cleaning substance or material. Similarly, the lower body of the cleaning apparatus, device, or structural system may be an elongated member with at least one substantially flat surface. The elongated member may or may not be adapted with a cavity portion. A cleaning portion may also be secured to the substantially flat surface of the lower body. For example, just as with the cleaning portion of the upper body, the cleaning portion of the lower body may include bristles of a brush, towel fibers, a microfiber material that is soaked in a disinfecting substance, or any other suitable cleaning substance or material. It will be appreciated that the examples of cleaning substances or materials provided herein are not limited, and thus, any cleaning substance or material can be used as the cleaning portion of the upper body or the lower body of the cleaning apparatus. It will also be appreciated that the cleaning portion of the upper body may be different from the cleaning portion of the lower body. It will also be appreciated that the upper body and the lower body may be any shape (or may be different shapes from each other), and thus, the present disclosure is not limited to a flat or substantially flat body.

The upper body and the lower body may be connected to each other. In some implementations, one end of the upper body may be connected to one end of the lower body. As a non-limiting example, a spring device (e.g., a spring) may be used to connect the one end of the upper body to the one end of the lower body, such that a certain amount of tension is constantly provided to each substantially flat surface of the upper body and the lower body to maintain an opening between the upper body and the lower body. Further, if pressure is applied to each of the other end of the upper body and the other end of the lower body (e.g., by pinching the ends of the upper body and the lower body using a user's thumb and index finger), then the opening between the upper body and the lower body may be reduced (e.g., to eliminate the opening between the upper body and the lower body). Upon removing the pressure (e.g., by removing the user pressure imposed by the user's thumb and index finger), the spring device may be released back to an original formation or orientation, thereby creating the opening between the upper body and the lower body. It will be appreciated that the present disclosure is not limited to a spring device connecting the upper body and the lower body, and thus, any connecting member (e.g., a swiveling axis with two metal plates) may be adapted to connect one end of the upper body to one end of the lower body. In some implementations, there may be no connecting member, or the connecting member may not be adapted to release back to the original formation or orientation once pressure is released. In the case of the connecting member, a natural pressure may not need to be applied to create the opening between the upper body and the lower body. The opening may naturally be created when the connecting member swivels, such that the end of the upper body that is not connected to the end of the lower body swivel away from each other along the axis created by the connecting member. In some implementations, one end of the upper body may be connected to the lower body and the other end of the upper body may also be connected to the other end of the lower body. In some implementations, the upper body may not be connected to any end of the lower body, and thus, both the upper and lower body may be independent members that are brought together by the user.

The cleaning apparatus, device, or structural system as described above (e.g., with a flat or substantially flat surface) may be operated by a user to clean or disinfect any surface. To illustrate and only as a non-limiting example, the user may place the belt within the opening between the upper body and the lower body. The user may then place a thumb at one end of the lower body and an index finger at one end of the upper body and apply pressure between the thumb and the index finger. The pressure applied causes the opening between the upper body and the lower body to be eliminated, such that the cleaning portion of the upper body and the cleaning portion of the lower body make contact with the seatbelt. The user may then maintain the pressure and move the closed cleaning apparatus, device, or structural system along the length of the seatbelt. In doing so, as the cleaning apparatus, device, or structural system is moved up and down along the length of the seatbelt, the cleaning portions of the upper body and the lower body continue to make contact with the seatbelt, and thus, perform a cleaning function on the seatbelt. In some implementations, when the user applies pressure to the ends of the upper body and the lower body to eliminate the opening (e.g., which causes the cleaning portions of the upper body and the lower body to make contact with the seatbelt), the ends of the upper body and the lower body (e.g., on which the pressure is applied) may be connectable using a hooking mechanism (e.g., by a hook or a connector, such as Velcro). If the ends of the upper body and the lower body on which the pressure is applied are connected using the hooking mechanism, then the user does not need to maintain the pressure on the ends of the upper body and the lower body in order to keep the cleaning portions of the upper body and lower body in contact with the seatbelt as the user moves the cleaning apparatus, device, or structural system along the length of the seatbelt.

In some implementations, instead of each of the upper body and the lower body being adapted with at least one substantially flat surface on which the cleaning portion is incorporated, each of the upper body and the lower body may be adapted to include a curved surface. The cleaning portion may be incorporated or embedded into the curved surface (e.g., in a "U" shape). In these embodiments, the opening between the upper body and the lower body may be eliminated in a similar manner as described above (e.g., when the user physically brings both the upper body and the lower body together), however, instead of surrounding a seatbelt, the curved surfaces of the upper body and the lower body enable the cleaning apparatus, device, or structural system to surround a bar (e.g., a cylindrical bar common in subway cars to provide support to riders holding the bar). When the cleaning apparatus, device, or structural system surround the bar, the user may similarly move the cleaning apparatus, device, or structural system along the axial length of the bar, so that the cleaning portions of the upper body and the lower body make continued contact with the bar to perform the cleaning function.

The cleaning apparatus, device, or structural system can be made of a lightweight and durable material, such as certain plastics, wood, or metal. The present disclosure is not limited to these examples, and thus, the cleaning apparatus, device, or structural system may be comprised of any suitable material. As an advantage, the cleaning apparatus, device, or structural system is portable and can be used daily by a user to keep certain surfaces clean (e.g., a seatbelt surface) before the user makes contact with the surfaces, thereby solving the challenges described above.

BRIEF DESCRIPTION OF THE DRAWINGS

The specification makes reference to the following appended figures, in which use of like reference numerals in different figures is intended to illustrate like or analogous components.

DETAILED DESCRIPTION

Surfaces, such as the surface of a seatbelt or support bar of a subway car, are often handled by many individuals. As a result, these surfaces can collect dirt, viruses, and bacteria, potentially causing harm to those who touch or otherwise handle the surfaces. Certain aspects and features of the present disclosure relate to a cleaning apparatus, device, or structural system adapted to clean surfaces of a support member (e.g., a support bar of a subway car) or a restraint member (e.g., a seatbelt). As described herein, certain aspects and features of the present disclosure relate to a cleaning apparatus that is adapted to be clamped over a seatbelt or support bar to perform a cleaning function. In some implementations, the cleaning apparatus may have an upper body and a lower body that are adapted to surround a seatbelt or support bar. The upper body and the lower body may have at least one flat or substantially flat surface. The flat or substantially flat surface of each of the upper body and lower body may be adapted to include (e.g., by embedding or otherwise physically incorporating) a cleaning portion. The cleaning portion can be any substance or material that, when pressed against a surface, causes a cleaning function to be performed on the surface. To illustrate and only as a non-limiting example, the cleaning portion may be a brush that is adapted to fit within the substantially flat surface of the upper body (and similarly of the lower body). When the cleaning apparatus is closed (e.g., when pressure is applied to ends of the upper and lower bodies to close the cleaning apparatus, so that the cleaning potion on each of the upper and lower bodies makes contact with the seatbelt), the pressure caused by the cleaning portion making contact with the seatbelt may clean the seatbelt of any dirt, grease, or bacteria. The user may move the closed cleaning apparatus along the length of the seatbelt to perform cleaning on the seatbelt. When the cleaning apparatus is closed, a hooking mechanism may keep the cleaning apparatus closed until the user unhooks or unlatches the hooking mechanism.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1A:
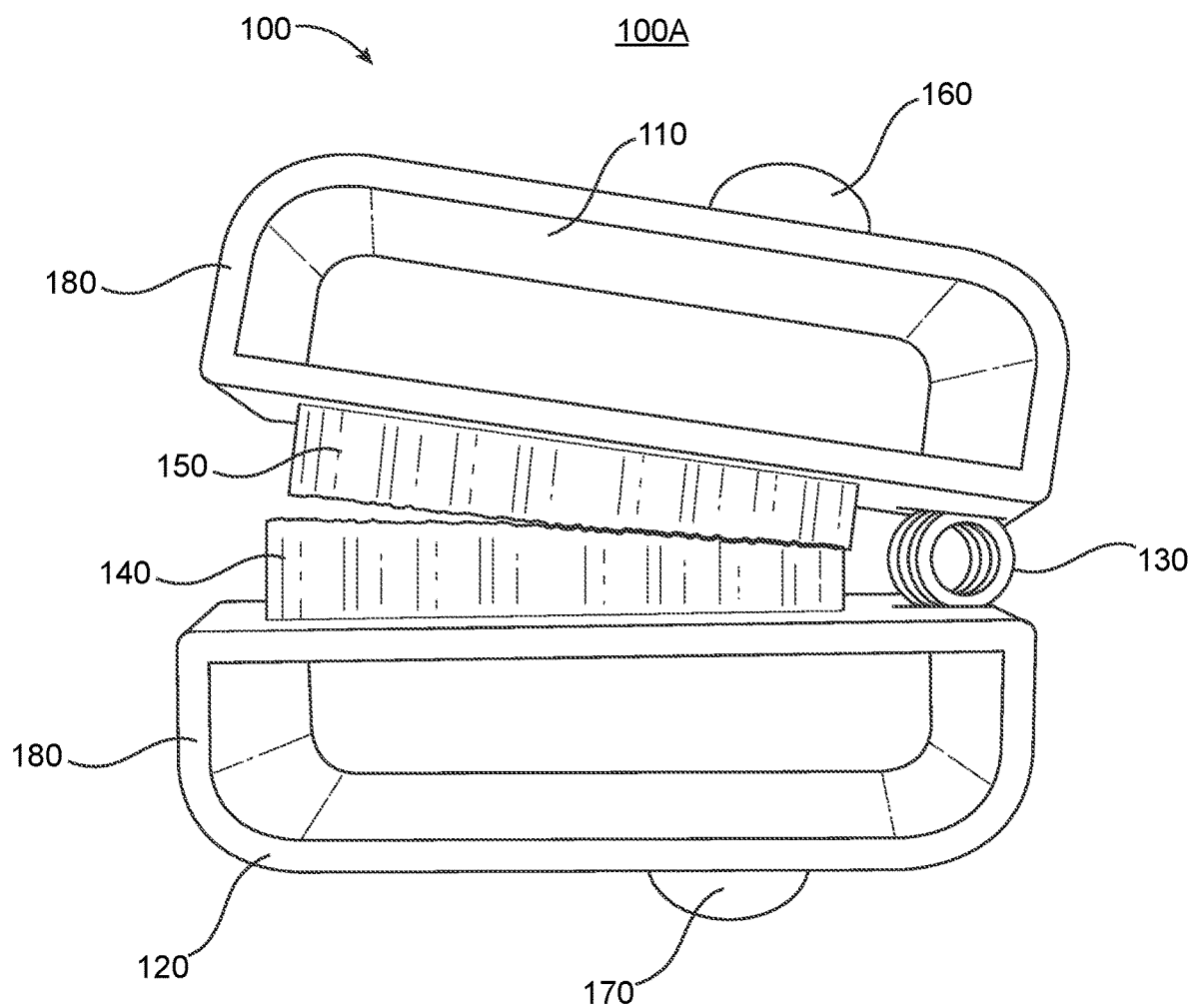
FIGS. 1A-1E illustrate different angles of a cleaning apparatus, according to certain aspects of the present disclosure.

FIGS. 1A-1E illustrate different angles of a cleaning apparatus 100, according to certain aspects of the present disclosure. FIG. 1A illustrates view 100A of the cleaning apparatus 100. The cleaning apparatus 100 may be a manufactured product that is lightweight and durable for daily use. For example, the cleaning apparatus 100 may be made of any combination of plastic (e.g., plastic used for injection-molded products), wood, glass, metal, or any other suitable material that is durable. The cleaning apparatus 100 may be manufactured using any suitable manufacturing technique, including three-dimensional (3D) printing.

The cleaning apparatus 100 may be adapted to include an upper body 110 and a lower body 120. While the upper body 110 and the lower body 120 are adapted to have the same shape in FIG. 1A, the present disclosure is not limited thereto. It will be appreciated that the upper body 110 and lower body 120 may have different shapes. The upper body 110 and the lower body may be connected at connection member 130. Connection member 130 may be a device, such as a spring, that is coupled to each of the upper body 110 and the lower body 120. Connection member 130 may be adapted to continuously apply pressure to the upper body 110 and the lower body 120 to keep the upper body 110 and the lower body 120 separated by an opening. As an illustrative example, a user may apply pressure at end 180 of upper body 110 and end 180 of lower body 120 to close the cleaning apparatus 100 over a surface, such as a seatbelt. The pressure applied by the user counteracts the continuous pressure applied by the connection member 130. Non-limiting examples of the connection member may include a spring, a piece of plastic that is in a "U" or "V" shape, or any other suitable mechanism that can continuously apply pressure to keep the upper body 110 apart from the lower body 120. In some implementations, the upper body 110 and the lower body 120 may be manufactured as a single piece, such that there is no separate connection member.

One or more of the upper body 110 or the lower body 120 may have at least one substantially flat surface. Cleaning portion 140 may be affixed to the flat surface of the lower body 120 and cleaning portion 150 may be affixed to the flat surface of the upper body 110. In some implementations, cleaning portions 140 and 150 may be the same cleaning substance or material. In other implementations, cleaning portion 140 may be comprised of a cleaning substance or material that is different from the cleaning substance or material that comprises cleaning portion 150. Non-limiting examples of the cleaning substance or material of cleaning portions 140 or 150 include microfiber fabric, a brush, a fabric soaked in a disinfectant solution, a disposable cleaning wipe, and any other suitable cleaning substance or material that can be affixed to the substantially flat surface of the upper body 110 and lower body 120.

Grip portions 160 and 170 may be a material added onto the cleaning apparatus 100 or engraved into the outside surface of the cleaning apparatus 100. Grip portions 160 and 170 may serve to enhance the grip experienced by a user handling the cleaning apparatus 100. While FIG. 1A illustrates grip portions 160 and 170 as semi-spherical shapes, it will be appreciated that grip portions 160 and 170 can be any shape, design, or pattern that enhances the grip of a user handling the cleaning apparatus 100.

A user may apply pressure on ends 180 of the upper body 110 and the lower body 120 to close the opening between substantially flat surfaces of each of the upper body 110 and the lower body 120. As the user applies pressure to ends 180, the cleaning portions 140 and 150 may make contact with a seatbelt, for example, to clean the surface of the seatbelt.

Figure 1B:
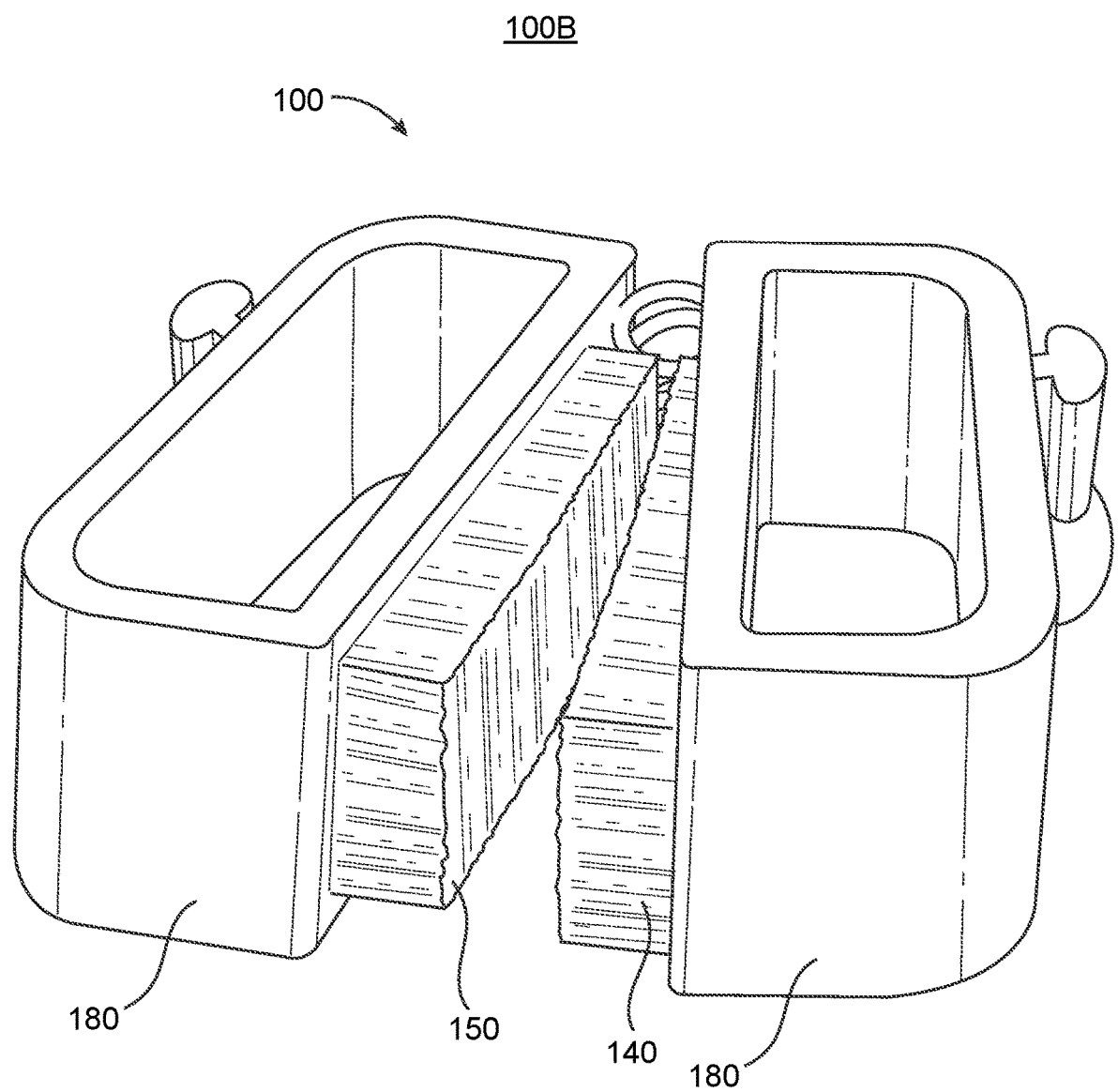
Figure 1C:
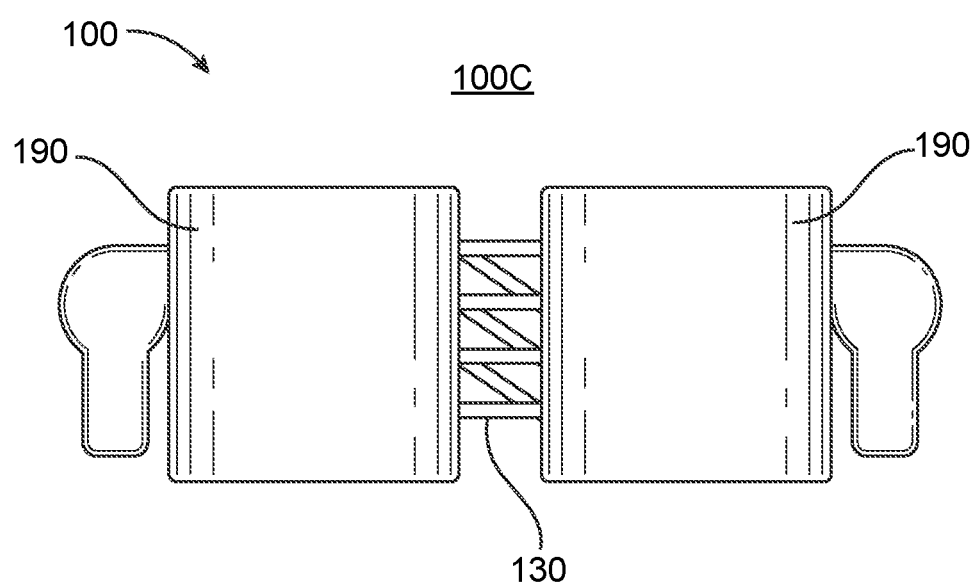
Figure 1D:
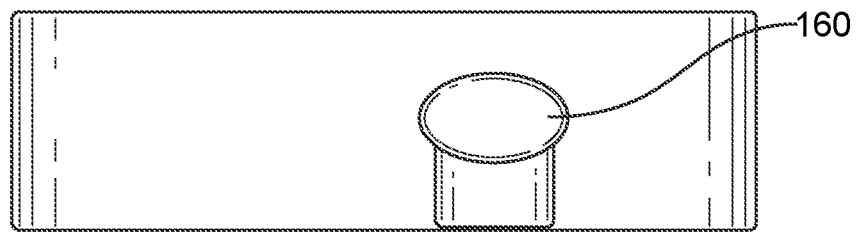
Figure 1E:
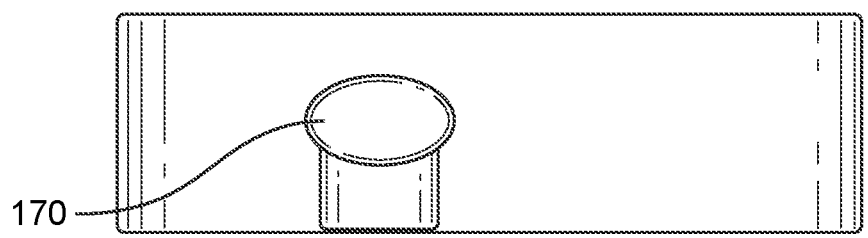

FIG. 1B illustrates the cleaning apparatus 100 illustrated in FIG. 1A, but viewed from angle 100B. FIG. 1C illustrates the cleaning apparatus 100 illustrated in FIG. 1A, but viewed from angle 100C. In FIG. 1C, the connection member 130 may be adapted to connect end 190 of upper body 110 and end 190 of lower body 120, so that the upper body 110 and the lower body 120 can rotate along an axis created by the connection member 130. FIGS. 1D and 1E each illustrate different angles 100D and 100E of the cleaning apparatus 100, respectively. Further, FIGS. 1D and 1E illustrate an example of grip portions 160 and 170.

Figure 2:
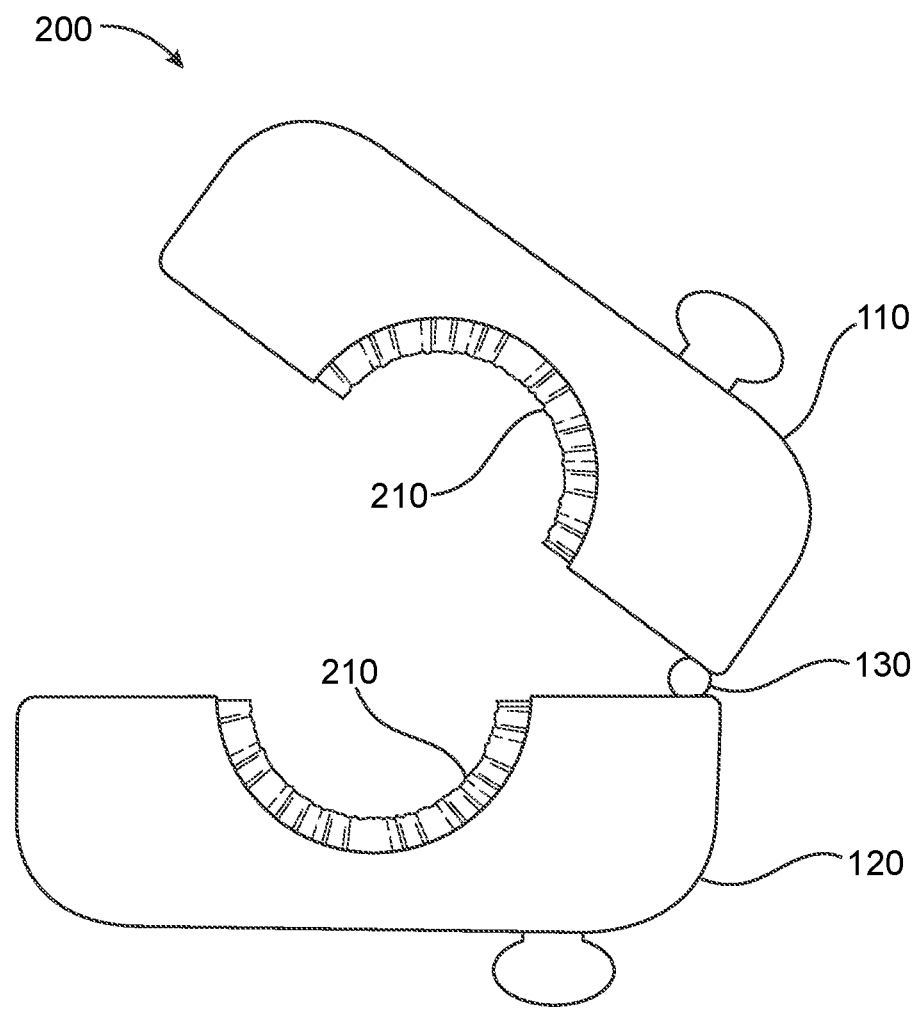
FIG. 2 is a view of a cleaning apparatus, according to certain aspects of the present disclosure.

FIG. 2 is a view of a cleaning apparatus 200, according to certain aspects of the present disclosure. Cleaning apparatus 200 is the same as cleaning apparatus 100, except that instead of a flat or substantially flat portion on which the cleaning portion is affixed, there is a curved portion 210 in each of upper body 110 and lower body 120, so that the cleaning apparatus 200 can surround a support bar, such as a support bar within a subway car.

Figure 3:
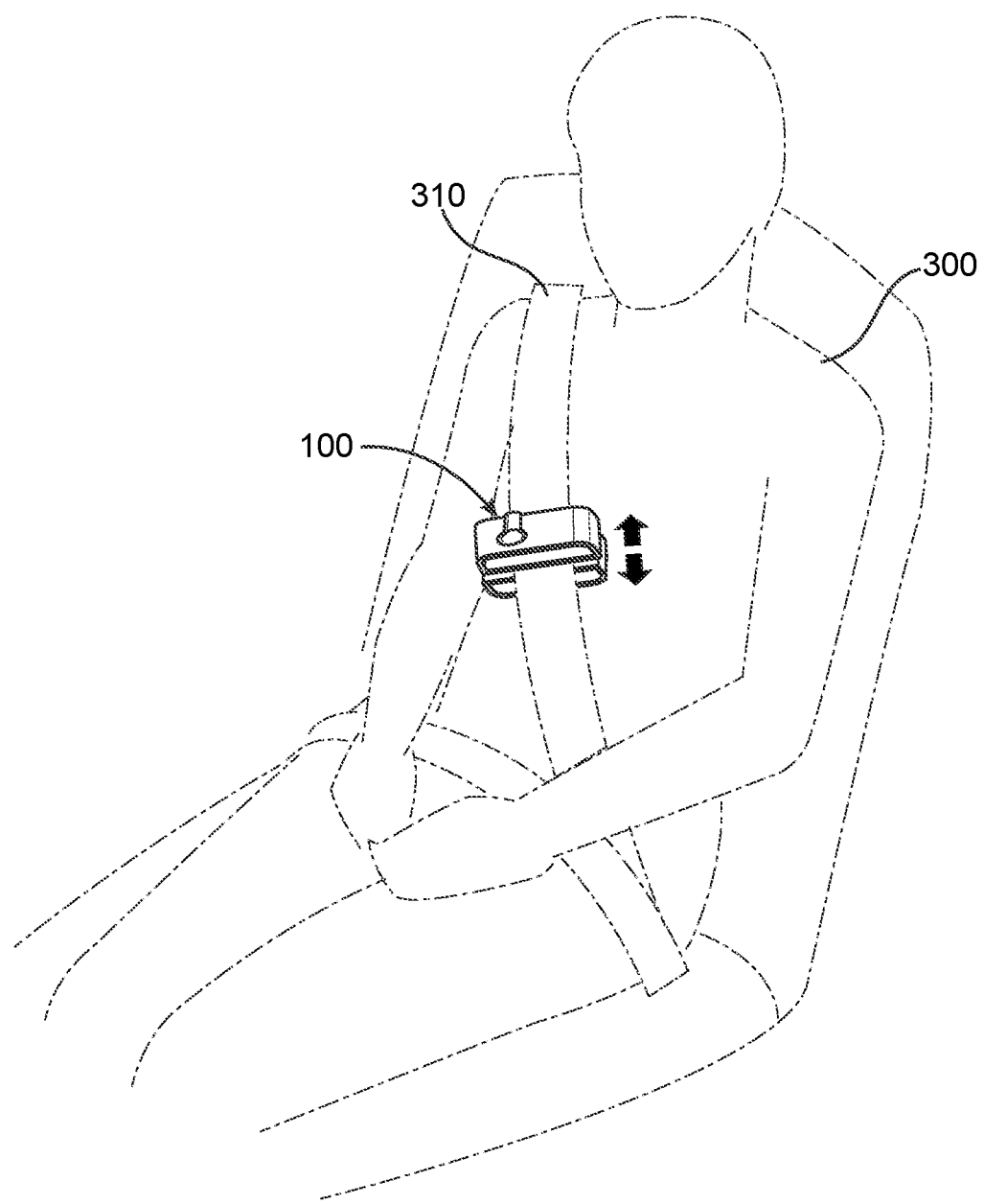
FIG. 3 is a view of a user operating a cleaning apparatus, according to certain aspects.

FIG. 3 is a view of a user operating a cleaning apparatus, according to certain aspects. In FIG. 3, user 300 may be seated in a car. Seatbelt 310 may be secured across the body of user 300. Cleaning apparatus 100 may be clamped around the seatbelt. User 300 may move the clamped cleaning apparatus 100 up and down along the length of the seatbelt to clean the surface of the seatbelt with the cleaning portions of the cleaning apparatus 100.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A portable, daily-use cleaning device for cleaning support members or restraint members, comprising:
    an upper body having a first rectangular elongated shape, the first elongated shape having a first end and a second end, and the first end of the first elongated shape being disposed opposite of the second end of the first elongated shape;
    a lower body having a second rectangular elongated shape, the second elongated shape having a first end and a second end, and the first end of the second elongated shape being disposed opposite of the second end of the second elongated shape;
    the upper and lower body having a hollow body with a through opening extending the width of the body;
    a first cleaning portion comprising a microfiber material coupled to a first planar surface of the upper body, the first cleaning portion being adapted to clean a surface using a first cleaning substance or material;
    a second cleaning portion comprising a microfiber material coupled to a first planar surface of the lower body, the second cleaning portion being adapted to clean the surface using a second cleaning substance or material;
    the first planar surface of the upper body facing the first planar surface of the lower body;
    and a spring connection member adapted to movably connect the first end of the upper body to the first end of the lower body, wherein an opening is created by the first end of the upper body being movably connected to the first end of the lower body, and wherein the opening is adapted to receive a support member or a restraint member;
    a first grip coupled to a second planar surface of the upper body, opposite the first planar surface of the upper body, the first grip comprises a semi-spherical protrusion extending upward from the second planar surface of the upper body;
    a second grip coupled to a second planar surface of the lower body, opposite the second planar surface of the lower body, the second grip comprises a semi-spherical protrusion extending upward from the second planar surface of the lower body.

2. The cleaning structural system of claim 1, wherein the connection member is adapted to rotatably move the upper body and the lower body along an axis, wherein when each of the second end of the upper body and the second end of the lower body receive pressure, the upper body and the lower body rotatably move towards each other along the axis to eliminate the opening.

3. The cleaning structural system of claim 2, wherein the opening receives the support member or the restraint member, and wherein when the opening is eliminated by the movement of each of the upper body and the lower body towards each other, each of the first cleaning portion and the second cleaning portion makes contact with the support member or the restraint member to perform a cleaning operation.

4. The structural cleaning system of claim 1, further comprising:
   a hooking mechanism disposed on the second end of the upper body and the second end of the lower body, wherein the hooking mechanism is adapted to connect the second end of the upper body and the second end of the lower body.

\* \* \* \* \*